Feb. 9, 1960    J. E. H. MORGAN ET AL    2,924,056
THRESHING MACHINES FOR FIELD CROPS
Filed Feb. 8, 1956    5 Sheets-Sheet 1

INVENTORS
J.E.H. MORGAN
& G.D. DROTSKY

BY Wenderoth, Lind & Ponack
Attys.

INVENTORS
J. E. H. MORGAN
& G. D. DROTSKY

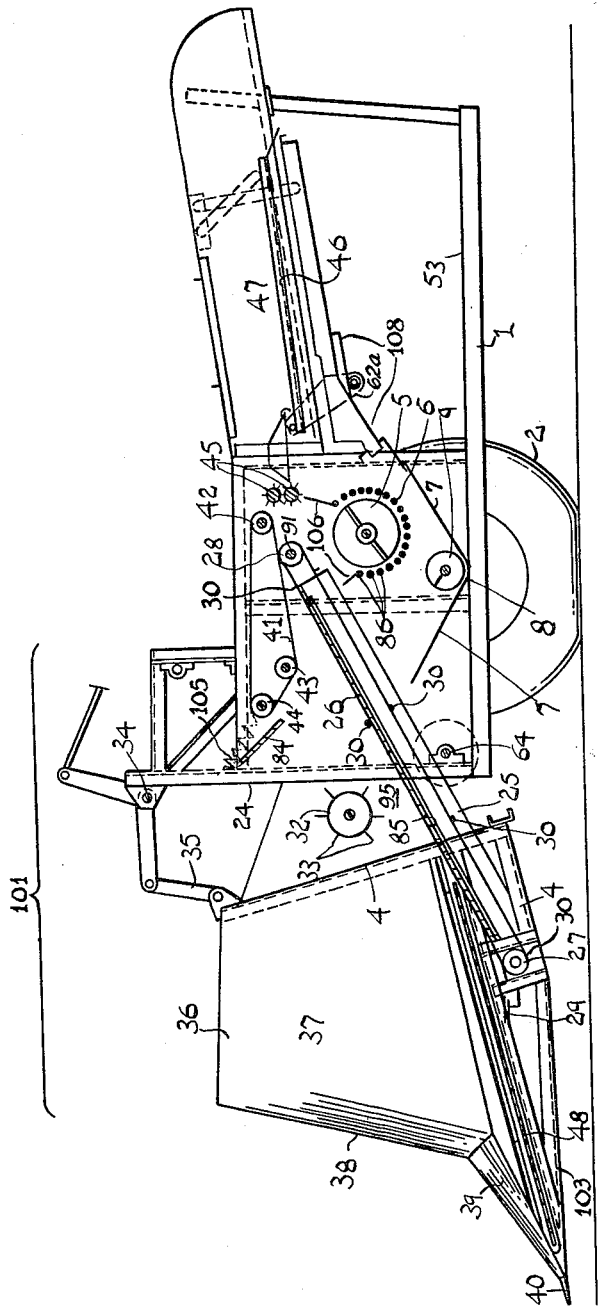

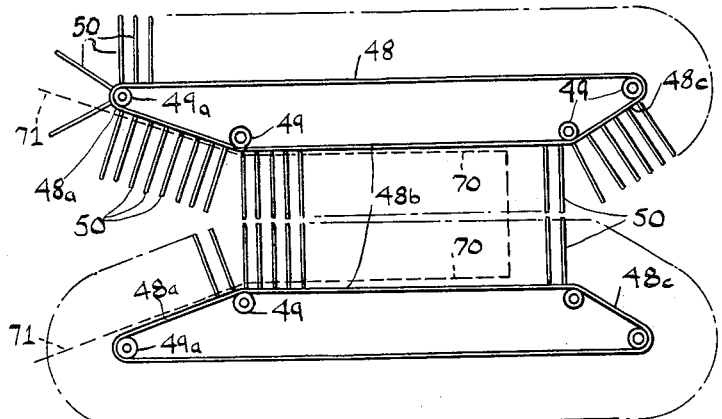
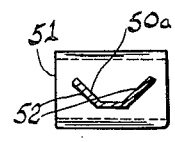
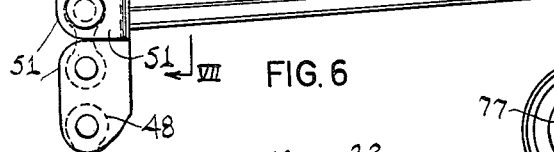
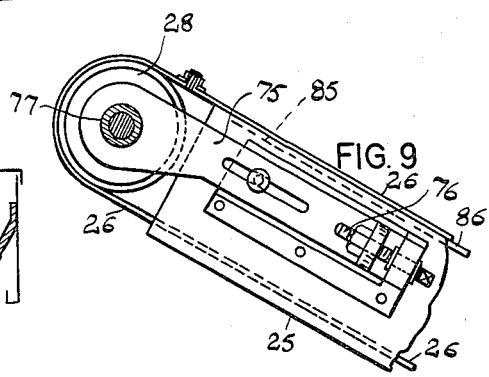
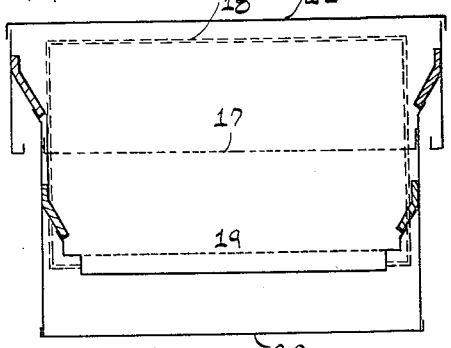
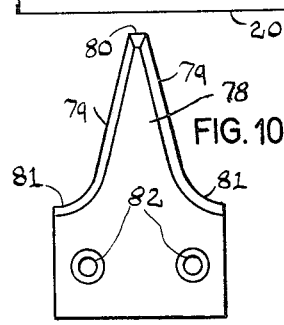
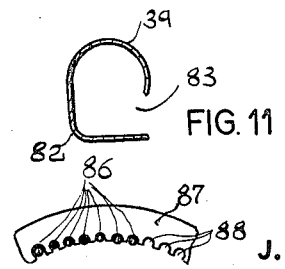
INVENTORS
J. E. H. MORGAN
BY & G. D. DROTSKY Feb. 9, 1960 J. E. H. MORGAN ET AL 2,924,056
THRESHING MACHINES FOR FIELD CROPS
Filed Feb. 8, 1956 5 Sheets-Sheet 5

JOHN E. H. MORGAN
AND GERT DROTSKY
INVENTORS

BY Wenderoth, Lind and Ponack
ATTORNEYS ce 2,924,056
Patented Feb. 9, 1960

United States Patent Office

2,924,056

THRESHING MACHINES FOR FIELD CROPS

John E. H. Morgan, Brakpan, and Gert D. Drotsky, Brenthurst, Brakpan, Union of South Africa Application February 8, 1956, Serial No. 564,308

Claims priority, application Union of South Africa February 10, 1955

6 Claims. (Cl. 56—66)

This invention relates to a corn harvester, particularly adapted to the field harvesting of maize or corn crops planted in rows.

The principal object of this invention is to harvest dry, ripe and leaning corn, of low moisture content, with less grain loss and at higher speeds than has been done heretofore by machines generally known as mechanical corn pickers, and to harvest green or high moisture corn with equal economy and speed so that the harvester will be suitable for use in any climate where maize is grown.

Another object of this invention is to combine all the operations of harvesting, snapping, shelling, cleaning, grading, bagging and transporting the grain in one mobile machine, with a minimum of grain loss and proper cleaning of the grain at a fast rate of harvesting.

A further object of this invention is to provide an improved corn or maize harvester in which the machine, when travelling along the rows of crops, will disturb the plants as little as possible, until they are well within the machine by bringing under them, near to the ground, at some distance on each side, a shovel-like scoop or shelf and by laying across the base of the plants in advance of the severing means a closely spaced grid-like structure which, relative to the maize plants, is stationary and arranged to catch any ears which may fall and to deposit such ears in or on the harvester.

Mechanical pickers, of the inclined serrated spiral snapping roll type, which snap the ears from the standing stalks, are in extensive use in territories where the maize or corn crops have sufficient moisture content, when being harvested, to avoid brittleness of the stalks and dryness of the ears and husks. In territories where the plants are allowed to become dead and dry before reaping, however, it is found that such known machines are unsatisfactory for various reasons. One of the reasons is that when a part of the machine travelling forward at normal working speeds strikes the dry plant, the shock to the plant is liable to cause some of the ripe ears to fall to the ground so that they are not collected by the machine. A further reason is that when the stalks of the plants are very brittle, because they are dried out completely, they are generally unable to withstand the gripping and pulling action of the snapping rolls whereby such plants break leaving part of the stalks above the rolls attached to the ears with a resultant accumulation of broken stalks, along with their leaves, to be fed into the sheller with the ears. This causes frequent jamming and stoppage of the machine. A third reason is that when the ears and husks are very dry, a large proportion of the husks or sheaths may be loose or open and the grain or kernels readily drop off the cobs and fall to the ground. When such ears come in contact with the snapping rolls, the rapid inward turning motion of the serrated rolls in fact causes shelling of the ears and the grain kernels dropping on the ground cannot be recovered. In order to minimize the aforementioned shortcomings of the known kinds of mechanical pickers, it is generally necessary to harvest early enough in the season and before the plants become too dry and brittle.

A still further object of the present invention is to provide an improved corn harvester which will avoid or minimize shocks to the plants due to the forward travel of the machine and to provide increased steering latitudes, making it easier for the driver to maintain clearance relative to the plants. Another object is to avoid any pulling action on the stalks. Yet another object is to avoid incidental shelling of the snapped ears until they are inside the machine where provision is made to catch the grain or kernels.

For better understanding of the present invention reference will now be made to the accompanying sheets of drawings which show a preferred form of a tractor-drawn machine embodying reaping, harvesting and threshing means. From the following description various features of the present invention will be apparent. In the said drawings like reference numerals after to like parts throughout the various views.

In the drawings:

Figure 3 is a longitudinal cross-section on line III—III of Figure 1;

Figure 4 is a diagrammatical representation of the coacting grating-forming devices;

Figure 5 is a side view of a preferred form of a grating-forming prong, drawn to a larger scale;

Figure 6 is a plan of Figure 5;

Figure 7 is a cross-section on line VII—VII of Figure 6;

Figure 8 is a cross-section of the cleaner unit taken on line VIII—VIII of Figure 2;

Figure 9 is a fragmentary side view of the top region of the reaping part mounting means and upper region of the crop elevating conveyor, drawn to a larger scale;

Figure 10 is a plan of one cutting element of the severing means, drawn to a larger scale;

Figure 11 is a cross-section of a crop lifter, drawn to a larger scale;

Figure 12 is a fragmentary cross-section of the cage-type threshing device, also drawn to a larger scale;

Figure 1:
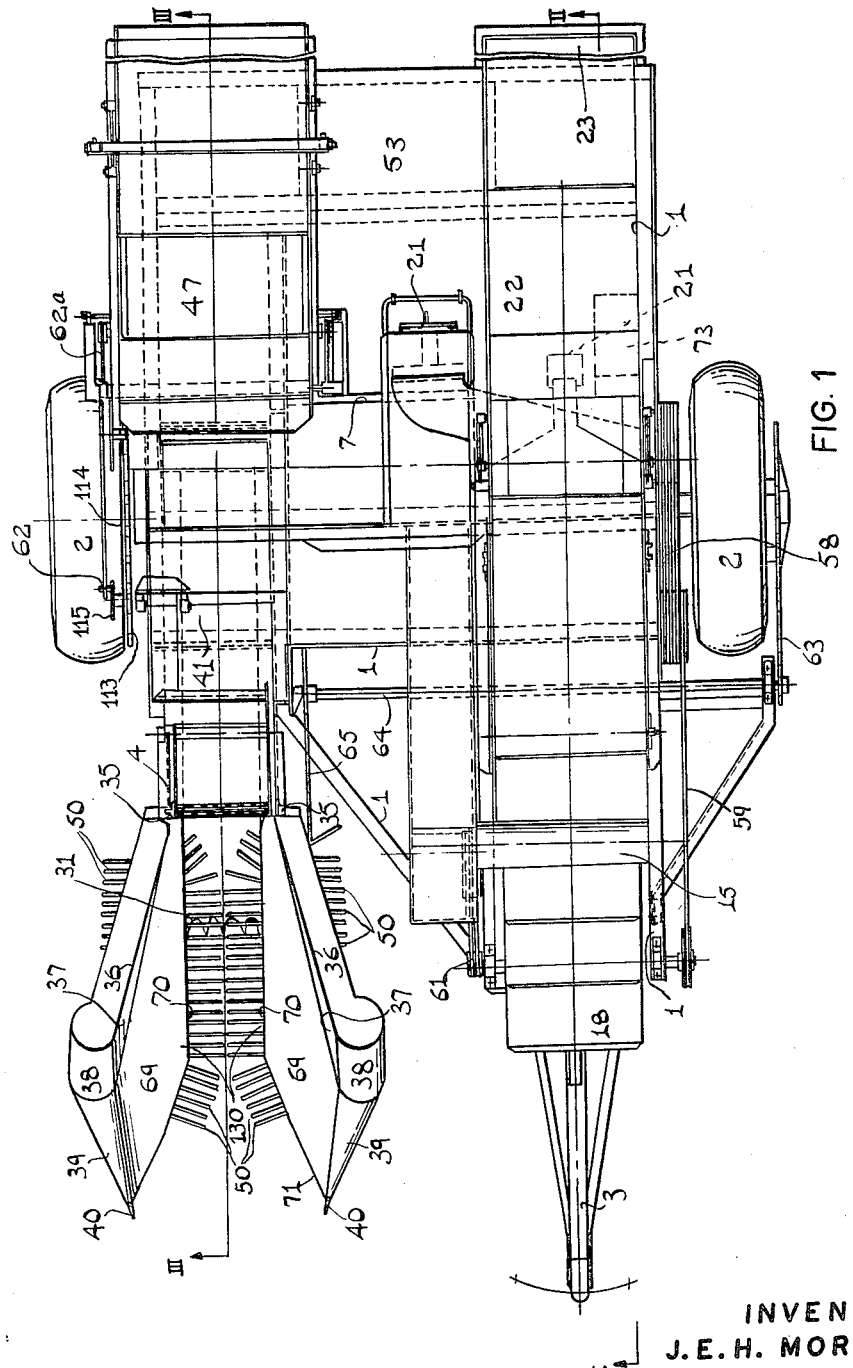
Figure 1 is a plan of a maize reaping, harvesting and threshing combine constructed according to this invention.

Referring to the drawings, a chassis, denoted by reference numeral 1, is supported on two parallel land wheels 2, preferably of large diameter and of the pneumatic kind, while from the front of the chassis 1 and adjacent one side an adjustable drawbar 3, for coupling to a tractor, extends in a forward direction. From the front of the chassis 1 and adjacent the opposite side the bifurcated forwardly projecting reaper part or structure 4 of the machine is located.

The threshing device 5, which is of the known cage type of the two stage kind, is transversely disposed within the superstructure and substantially parallel to and more or less above the wheel axis but preferably slightly rearwardly of said axis. Said threshing device 5 extends substantially across the entire width of the chassis 1 and is adapted to receive the ears as they are separated from the plants by snapper rollers 45, with or without the ear sheaths, at one end while the leaves and trash are discharged on to the land at the opposite end. In spaced relationship below the entire length of the cage 6 of the threshing device 5 a downwardly converging trough 7 is disposed for receiving the discharge from the cage 6 which takes place between the cage grid bars 86. Within the curved lower part 8 spiral conveyors 9 are operatively disposed for conveying the cage discharge into a recessed region 10 at the centre of the trough 7 from whence a grain elevator 11 conveys the kernels and the like to an elevated position for subsequent screening and winnowing purposes.

Figure 2:
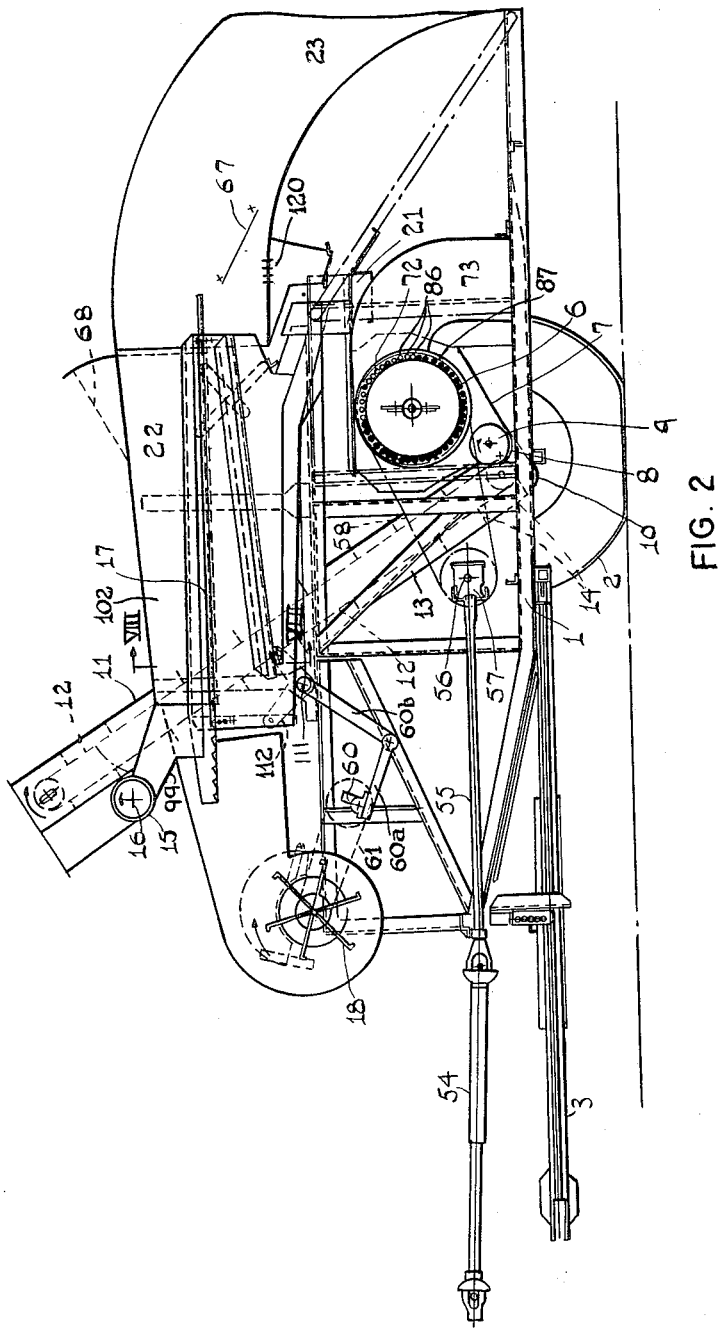
Figure 2 is a longitudinal cross-section on line II—II of Figure 1.
Figure 13:
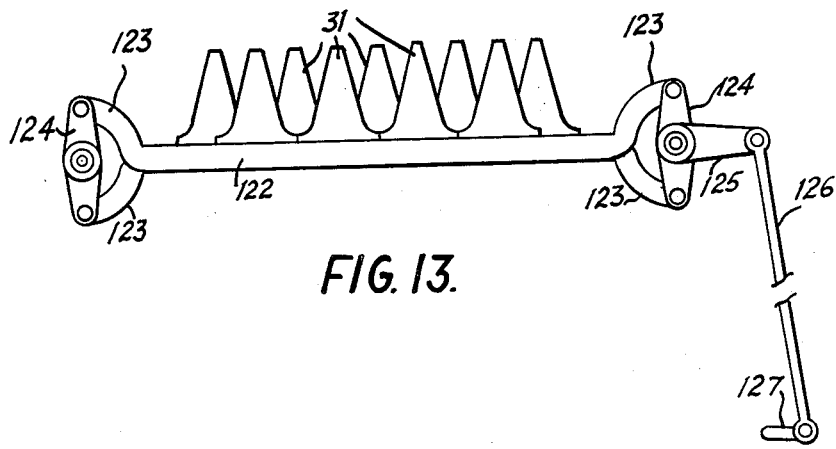
Figure 13 is a plan view showing the crop severing means.
Figure 14:
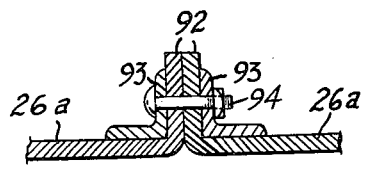
Figure 14 is an enlarged fragmentary cross-section of the crop conveyor as shown in Fig. 9 showing the transverse ridge-forming connections of the crop conveyor.

Said grain elevator 11 is obliquely disposed in the centre region of the machine between the maize plant elevating and maize plant handling section 101 (Figure 3) and the section 102 (Figure 2) where the kernels are screened, cleaned, graded and bagged. Said grain elevator 11 comprises a belt or chain 12 operatively disposed in an inclined trough or chute-like structure 13 and is provided with a plurality of transverse projections 14, brushes or the like for sliding movement along the bottom of the said trough or chute structure 13 whereby the kernels and the small trash particles are dragged upwardly along said bottom surface.

Adjacent the top of the said oblique trough or chute structure 13, which extends obliquely upwardly and forwardly, a transverse gutter 15 is disposed into which the kernels and small trash particles are discharged by the transverse projections 14 of belt 12 for transverse movement along said gutter by a rotatable spiral conveyor 16 for subsequent discharge by chute 99 on to a screen or sieve 17, hereinafter termed the main kernel sieve. Substantially forwardly and below the said gutter 15 a fan 18 is mounted which is adapted to direct an air draught along the upper and under faces of the said main kernel sieve 17 in order to subject the kernels to a winnowing action before reaching, while on, and after leaving said sieve 17. A second sieve 19 is provided below the aforesaid main sieve 17 for separation of broken kernels or the like while the discharge of large clean kernels from said second sieve 19 on to a grain pan 20 or the like for direction to bagging means 21 which is disposed towards the rear of the chassis 1. Said sieve is preferably disposed in a duct 22 which in respect of its rear region 23 is curved downwardly for directing the trash discharged therethrough on to the land. The sieve 19 is so arranged that the grain, after it has fallen through the main sieve 17 flows counter to the air stream in known manner.

The aforesaid bifurcated reaper structure 4 is pivotally connected to the superstructure 24 about a horizontal axis disposed in parallel relationship substantially above the transverse threshing cage device. The mounting of said structure is by means of obliquely disposed parallel and transversely braced rigid beams 25 which are pivotally attached by their rear elevated ends about shaft 91 to the superstructure 24. Said rigidly connected beams 25 carry the crop elevating conveyor 26 adapted to receive the severed maize plants. The said crop elevating conveyor 26 consists of a wide belt which passes over two spaced rollers 27 and 28 of which the upper roller 28 may be located above the threshing cage 6 whereas the lower roller 27 is disposed behind the plant-severing means 29. Said conveyor belt 26 is provided at intervals with transverse ridge-like projections 30 to facilitate the conveyance of the maize plants deposited on the belt. The upper roller 28 is fixed to the shaft 91.

The severing means 29 comprise two straight and superimposed reciprocating bars 122 each providing forwardly directed converging teeth-like cutting elements 31. The bars 122 have extensions 123 on both ends for pivotal connection to the ends of a spaced pair of horizontally disposed rocker members 124 so that when rocking motion is imparted to the rocker members the bladed bars 122 are reciprocated in opposite directions and are retained substantially in line above one another.

The belt of the severed maize plants elevating conveyor 26 comprises an endless belt which may be composed of a plurality of belt lengths 26a of which the marginal transverse end regions 92 are secured to one another by bending such marginal regions outwardly and securing the inner faces together between angle iron members 93 by means of bolts 94 thus forming outwardly projecting transverse ridges which facilitate the conveyance of the severed plants.

At a transverse elevated position across the crop elevating conveyor 26 and rearwardly of the severing means 29 a driven rotatable drum 32, having longitudinal and arcuately spaced projections or fins 33, is provided to form a restricted space 95 above the conveyor 26 and for causing the severed plants to fall on to the conveyor in an orderly manner, severed end first, for said plants to be carried longitudinally on said conveyor 26 with the said severed end leading. Said drum 32, when rotated, is adapted to have the longitudinal fins 33 sweep rearwardly below the axis of rotation for such fins to perform a beating action on the plants to force them down by a beating action on to the conveyor 26.

The said bifurcated reaper structure 4 may be raised and lowered about its pivot axis and relative to the chassis 1 whereby the height adjustment of the intake, cob-saving grid or grating means, severing means 29 and other associated parts may suit the land ridges or furrows and the crop without altering the level or inclination of the machine proper. A lifting mechanism, conveniently consisting of a crank-armed horizontal shaft 34 from which said structure 4 is suspended by links 35, is pivotally mounted on the superstructure 24 and rotated through its limited rotational angle by suitable manually operated lever means, hydraulic cylinders or the like which are not shown.

The said reaper structure 4 provides forwardly spaced limb structures 103 of which the inner longitudinal sides are in wide parallel spaced relationships in respect of their major parts but diverging forwardly in respect of the front regions. High side wings 36 are mounted on the outward longitudinal regions of said limb structures 103 while platforms 69 are formed on the upper faces of said limb structures to extend between the said parallel and diverging sides of the limb structures 103 and the bottom regions of said side wings 36 and preferably sufficiently high to take in most of the plants in the row which is being reaped so as to catch ears which may drop off. The parallel spacing between the said limb structures 103 should be sufficiently wide to be operable on irregular plant rows and to eliminate contact of the forwardly moving parts of the reaper with most of the plants and also to permit steering lattitude.

The wings 36 are in fact substantially vertical plates of which the front regions diverge forwardly to provide upright oblique faces 37. The leading edges of said wings 36 are rounded outwardly to form rounded or bulbous plant-contacting regions 38 over which the plants may glide while cutting of the plants and pulling off of the cobs or stalks are avoided. On the bottom front regions of the limbs and wings 36 curved substantially conically shaped and forwardly projecting elements 39 are provided to form crop lifters which during operation are wedged under fallen-over or leaning plants to guide such plants between the wings 36. Such crop-lifting devices may be provided with points 40 on the front ends in order to get under the fallen plants without disturbing the ground or causing obstructions or lifting of the soil.

The pressure belt 41 along the top end of the crop elevating conveyor 26, is run over three rollers 42, 43 and 44 along a triangular path while the foremost roller 44 is biased by spring 105 to retain the belt 41 taut thus permitting inward deflection of the pressure belt due to the crop passing below it and over the top roller 28 of the elevator conveyor 26. Said endless pressure belt 41 is preferably jointless to allow transverse and longitudinal flexibility to accommodate the irregular and uneven passes of crop plants. The pressure belt 41 and elevating conveyor 26 are run at the same speed.

In the rearward spaced relationship behind and slightly lower than the contacting region of the pressure belt 41, and the crop elevating conveyor 26, the ear snapping rolls comprising parallel spaced horizontal driven rollers 45, are provided. Said rolls 45 are provided with longitudinal ridges on their circumferential surfaces and preferably spaced at such a distance apart that they grip the stalks of the severed plants and run at virtually the same surface speed as the belts 26 and 41 so that they do not produce a drawing action on the severed plants which are fed between them severed ends first. However, the spacing is insufficient for passage between them of the ears which are consequently broken off or separated from the plants with or without their sheaths to drop into the threshing cage 6. The threshing cage 6 has its intake 106 arranged substantially below the said separating roll 45.

The maize plants, after passage between the snapper rolls 45, are deposited on a slightly up- and rearwardly inclined shaking sieve 46 for separation of loose kernels retained in the sheath leaves and the like. The separated kernels are directed along slanting surfaces 108 into the aforesaid transverse trough 7 below the cage 6 while the stalks and leaves are discharged on to the land over the raised end of the sieve 46. Said sieve is operatively disposed in a casing 47 providing an outlet at the rear of the machine for discharging the stalks and leaves on to the land.

The movable grid- or grating-forming devices associated with the limb structures 103 of the reaper structure 4 consist of two endless roller chains 48 passing over sprockets 49 and having outwardly directed pronglike members 50 which are secured to U-shaped elements 51. Each of said U-shaped elements 51 form outer side plates of the roller chains and are in fact chain bridge pieces. The prongs 50 are preferably spring steel rods, suitably heat treated. Said prong chains 48 of both reaper structure limbs are operatively located in a common plane which is slightly obliquely disposed in a raised rearward direction. Said chains 48 are adapted to be operatively disposed above the severing means 29 and the lower region of the crop elevating conveyor 26.

The operative runs of the pronged chains 48 are rearwardly directed and move rearwardly at substantially the same speed as the forward speed of the machine while the tips of the prongs 50 of adjacent chains are adapted to be disposed in close spaced, but preferably not overlapping relationship along their operative runs. The forwardly moving return runs of the chains are arranged to be disposed on the outside of the wings 36 while the foremost chain sprockets 49a are located rearwardly of the front tips of the crop lifters 39. The operative runs of such movable grating-forming chains 48 are preferably driven from a land wheel 2 of the machine and such grating is laid by the machine, stationary relative to the ground, around the base of the plants irrespective of the travelling speed of the machine. Said grating is laid in advance of the severing means 29 and rearwardly thereof so that there will be no shock on the plant until the grating has been laid around the plant for a suitable distance in advance of the severing means 29 in order to catch any ears which may fall from the plant for raising and conveyance of such fallen ears on to the crop elevating conveyor without any tendency to shell such ears. After severing of the plants the severed ends of such plants are retained by the prongs 50 for transference on to the crop elevating conveyor 26.

The rearwardly moving operative runs of both pronged chains 48 are firstly rearwardly convergent as at 48a, then parallel as at 48b and finally divergent as at 48c. The diverging angle is such that once the severed ends of the plants are transferred on to the crop elevating conveyer 26, the faster speed of the said conveyor carries the severed plant ends away and free of the prongs 50 so that no stalks are carried in a lateral direction by the chains 48. The surface speed of the elevating conveyor 26 must be substantially faster than the chain speeds. Due to the faster speed of conveyor 26 the severed plants are caused to drop on to such conveyor with the severed ends leading—this action being further assisted by the rotating finned drum 32. In the preferred form of construction the prongs or fingers 50 are modified as is shown in Figures 5, 6 and 7 to form prongs or fingers 50a which are constructed from suitably heat treated spring steel or like material strips of slightly converging shape and suitably rounded in respect of the smaller free ends. The opposite larger ends of the prongs 50a are secured to the U-shaped or like elements 51 which form part of the chains 48. In cross-section such prongs 50a are of trough-shape to provide oblique upwardly projecting marginal edges 52 which, when engaging the unsevered plants, cause an upward drag or lift on the parts of the plants due to the rear and upward inclination of the chains 48. This action tends to lift any ears which may be low on the plants and to convey them on to the elevator conveyor 26.

To prevent downward tipping of the prongs 50 or 50a during the active or operative and return runs of the chains 48, the prongs of such chains, adjacent their fixed ends, are adapted to slide on longitudinally arranged supporting bars (not shown).

A bagging platform 53 is provided on the rear region of the chassis 1 for handling, changing and transportation of bags of grain and for providing a working space for attendants.

In known machines the cage bars 86 were secured in holes drilled in annular members 87. According to this invention, the said bars 86 are rigidly secured, such as by welding, in spaced notches 88 provided in the inner circumferential edges of the various annular members 87.

The machine above described is tractor drawn, the power for the various working parts being obtained from the tractor power take-off which is not shown. The power take-off connecting shafts 54 and 55 drive a transversely disposed shaft 56 through suitable bevel gears (not shown) in a housing 57. The threshing device beater and the fan 18 are driven from said shaft 56 by belt drives 58 and 59. From the fan shaft a belt 61 drives the shaking mechanism which comprises a crank shaft 60 of which the crank is connected by a link 60a to a crank arm 60b of a shaft 111 on which bell crank levers 112 are mounted. On said bell crank levers 112 the sieves 17 and 19 are supported so that on rocking of the shaft 111 such sieves are reciprocated in a longitudinal direction. A further belt drive, not shown, from the said crank shaft 60 drives the grain elevator conveyor belt 12 and spiral grain conveyor 16.

The threshing device beater shaft drives a wheel 113 by a chain or belt drive 114 while a cranked wheel 115, associated with said wheel 113, causes reciprocation of connecting rod 62 which in turn causes oscillation of levers 62a on which the sieve 46 is supported. Chain and/or belt drives to the rolls 45, roller 42 of pressure belt 41, roller 28 of the crop elevating conveyor 26, spiral conveyor 9 and drum 32 are not shown but may be according to any suitable and convenient arrangement. As stated previously, the chains 48 are driven from one of the land wheels 2 by way of a chain drive 63, transverse shaft 64 and further chain drive 65 and gears of any known arrangement which are not shown. The drive to the severing means may be of any known construction or arrangement and is also not shown. The drive to the severing means may be derived from one of the land wheels 2 or from any of the driven shafts, as may be convenient, this drive is now shown.

In the bottom of duct 22, immediately behind the sieve 19, an opening 120 is provided for discharge of broken kernels or the like passing over such sieve. The opening 120 in the duct 22 connects with a bagging hopper 66. To prevent trash from entering the hopper an oblique baffle plate 67 is mounted within the duct 22 and in spaced relationship across said opening. For inspection and cleaning purposes, a trap door 68 is provided in the top of the duct 22 above the rear region of sieve 17.

In order that the crop elevating conveyor 26 may be readily tensioned the top region of the beam-like structure 25 provides a telescopically adjustable part 75 which mounts the roller 28 and the pivotal connection, e.g. a bearing 77, coaxially with roller 28. Screw means 76 is mounted on the structure 25 and engages a coacting screw threaded fixed nut on part 75 so that part 75 may be extended or retracted relative to structure 25 resulting in forcing the reaping part 4 of the machine further forward or drawing it closer to the superstructure 24 and chassis 1.

The discharge of cobs, leaves and trash from the threshing cage is through an opening 72 provided in the upper rear region of such cage at the remote position relative to the end at which the cage is charged. The discharge of the cobs, leaves and trash is into a curved duct 73 for direction on to the ground.

The spacing of the faces 37 of wings 36 is substantially greater than the parallel space 130 provided between the forwardly projecting limb structures 103 so that the platforms 69, formed on the top of said limb structures 103, may be of a fairly large size. Said platforms 69 extend from the parallel sides of the limb structure 103 to the bottom regions of the said side wings 36. Such platforms 69 are obliquely disposed and slope downwardly in a forward direction and also towards the said space 130. The ears dropping off the plants will move, such as by rolling from the oblique platforms 69, on to the grating-forming prongs 50 or 50a for transference on to the crop elevating conveyor 26. The chains 48 are operatively disposed below the platforms 69 with the prongs 50 or 50a extending beyond the edges 70 of the platforms 69.

By way of example only the spacing between the parallel edges 70 of the platforms 69 is approximately 14" while at the front said side wings 36 are 3' 6" apart and converge rearwardly to a spacing of about 1' 8".

The rounded front edges 38 of the side wings 36, during forward motion of the combine brush aside the touching or overlapping leaning plants of adjacent rows of plants with a minimum of disturbance.

Figure 15:
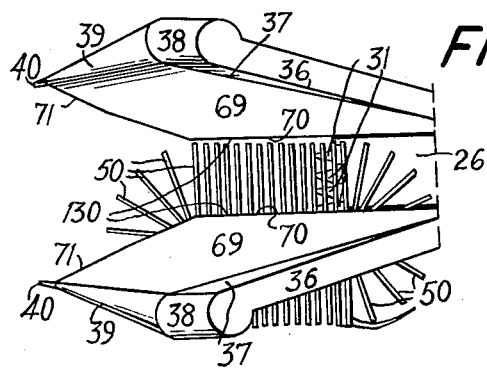
Figure 15 is a fragmentary plan of a modified reaping part of the harvester according to this invention.

If particularly desired a single chain 48 having prongs 50 or 50a may be provided instead of two coacting pronged chains. In the case of a single chain the prongs 50 and 50a must be capable of sweeping the full width of the gap or space 130 between platforms 69 (see Figure 15).

Each cutting or severing element 31 of the plant severing means comprises a plate 78 presenting forwardly converging cutting edges 79 and a short front transverse cutting edge 80. Said converging edges 79 are curved outwardly in respect of the rear regions as at 81. In the rear part of each element holes 82 are provided for fixing on to a reciprocating bar by bolts or the like. A plurality of such elements 31 are fixed adjacent one another in abutting engagement on a reciprocable bar.

Said conical crop-lifting elements 39 (which are manufactured from sheet metal) are preferably of the cross-sectional shape as shown in Figure 11 to present a rounded outwardly directed corner 82 and a longitudinal slot or groove 83 through which the prongs 50 or 50a project, such slot or groove being below the curved effective crop-lifting face of the element 39.

What we claim is:
1. In a corn harvester of the kind described, a reaper structure comprising two forwardly projecting limb structures on the front thereof forming between them a space which is parallel in respect of its major part and forwardly divergent in respect of the front part, slightly downwardly extending converging platforms on top of said limb structures, upright forwardly diverging wings on the outer sides of said platforms and limb structures each having a step formation on the front thereof, forwardly projecting conically shaped crop lifting elements on the front of said wings, platforms and limb structures, means extending transversely of the reaper across the rear region of said space between said limb structure for severing the standing corn plants as the harvester advances along the rows of crop plants, sprockets on at least one of said limb structure below the platforms on said limb structure, at least one endless chain mounted on said sprockets, a plurality of closely spaced outwardly projecting prongs on said chain extending, in respect of the rearwardly directed operative runs of such chains, across the parallel region of the space between the limb structures to form a grating, and in respect of said endless chain in the plane of motion of said chain, means on said reaper structure for driving said chain at a speed which is the same as the speed of the harvester over land whereby the rearwardly moving operative runs are stationary relative to the standing plants received between said prongs, a severed crop conveyor having a width the same as the space between said limb structures on said reaper structure, said conveyor extending from behind the severing means upwardly and rearwardly, connected beams on said harvester on the front ends of which are rigidly mounted the said reaper structure, a horizontal axle on said harvester on which the rear ends are pivotally mounted, said axle being at an elevated position with respect to said reaper structure, said conveyor receiving the severed plants and ears collected on the platform and the rearwardly moving grid formed by the prongs and feeding them between corn snapper rolls and into a threshing device on the harvester.

2. A reaper structure as claimed in claim 1 in which there are sprockets on only one of said limb structures, and there is only one endless chain mounted on said sprockets on said one limb structure below the platform of said limb structure, and the plurality of closely spaced outwardly projecting prongs on said one chain extend entirely across the parallel region of the space between the limb structures to form a grating.

3. A reaper structure as claimed in claim 1 in which there are sprockets on both of said limb structures, and two endless chains, one on the sprockets on each of said limb structures, the plurality of closely spaced outwardly projecting prongs on said chains extending substantially half-way across the parallel region of the space between the limb structures to form a grating.

4. A reaper structure as claimed in claim 1 in which the crop conveyor comprises an endless belt, rollers mounted on said structure behind the crop severing means and coaxially with the elevated pivot axis of the beams of the reaper structure over which said belt passes, a driven pressure belt across the top of said conveyor where it runs around the roller coaxial with the elevated pivot axis, said pressure belt being disposed in converging arrangement with said conveyor and being driven at the same surface speed as the conveyor, the bottom run of the pressure belt being driven in a rearward direction relative to the direction of movement of the reaper structure and being in engagement with the said conveyor and extending rearwardly of the conveyor roller coaxial with the elevated pivot axis to direct the severed plants in a longitudinal direction between two spaced snapper rollers, one of the pressure belt rollers being spring mounted permitting displacement of the roller transversely of the rear of the belt whereby said bottom run of the pressure belt is deflectable in an upward direction, the conveyor speed being faster than the speed of the chains for fast conveyance of the severed ends of the plant to cause forward tilting of the severed plants and orderly removal of said severed plants with the severed end leading.

5. A reaper structure as claimed in claim 4 in which said endless belt comprises a plurality of belt pieces of which the transverse ends are secured by outward bending of transverse marginal regions, angle iron members in the corner regions formed by said outwardly bent marginal regions, and a plurality of spaced bolts passing through said angle irons and the coacting marginal regions of the said belt, for coupling the belt pieces to each other.

6. A reaper structure as claimed in claim 1 in which each chain prong comprises an outwardly converging plate-like element having trough-like cross-section with a rounded apex region, and said chain having U-section elements forming the outside plates thereof to which the end of said prongs opposite the apex region are secured.

References Cited in the file of this patent

UNITED STATES PATENTS

| | | |
|---|---|---|
| 1,882,823 | Hale et al. | Oct. 18, 1932 |
| 2,467,790 | Welty | Apr. 19, 1949 |
| 2,629,978 | Krause et al. | Mar. 3, 1953 |

FOREIGN PATENTS

| | | |
|---|---|---|
| 500,748 | Belgium | Feb. 15, 1951 |